(12) United States Patent
Zhang et al.

(10) Patent No.: US 11,850,629 B2
(45) Date of Patent: Dec. 26, 2023

(54) PIEZOELECTRIC SENSOR ASSEMBLY AND MANUFACTURING METHOD THEREOF, DISPLAY PANEL AND ELECTRONIC DEVICE

(71) Applicant: BOE Technology Group Co., Ltd., Beijing (CN)

(72) Inventors: Chenyang Zhang, Beijing (CN); Yingming Liu, Beijing (CN); Haisheng Wang, Beijing (CN); Peixiao Li, Beijing (CN); Xiufeng Li, Beijing (CN); Yuzhen Guo, Beijing (CN); Yanling Han, Beijing (CN); Lijun Zhao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 469 days.

(21) Appl. No.: 17/253,659

(22) PCT Filed: May 25, 2020

(86) PCT No.: PCT/CN2020/092089
§ 371 (c)(1),
(2) Date: Dec. 18, 2020

(87) PCT Pub. No.: WO2020/253473
PCT Pub. Date: Dec. 24, 2020

(65) Prior Publication Data
US 2021/0331204 A1    Oct. 28, 2021

(30) Foreign Application Priority Data
Jun. 18, 2019 (CN) .......................... 201910529664.X

(51) Int. Cl.
*B06B 1/06*    (2006.01)
*G01D 5/62*    (2006.01)
*G06F 3/043*    (2006.01)

(52) U.S. Cl.
CPC ............ *B06B 1/0607* (2013.01); *B06B 1/067* (2013.01); *G01D 5/62* (2013.01); *G06F 3/043* (2013.01); *B06B 2201/55* (2013.01)

(58) Field of Classification Search
CPC ... B06B 1/0607; B06B 1/067; B06B 2201/55; G01D 5/62; G06F 3/043
See application file for complete search history.

(56) References Cited

U.S. PATENT DOCUMENTS 5,644,085 A * 7/1997 Lorraine ............... B06B 1/0629
29/25.35
7,348,713 B2    3/2008 Hashimoto
(Continued)

FOREIGN PATENT DOCUMENTS

CN    1897876 A    1/2007
CN    103210665 A    7/2013
(Continued)

OTHER PUBLICATIONS

First Office Action, including Search Report, for Chinese Patent Application No. 201910529664.X, dated May 27, 2020, 16 pages.

*Primary Examiner* — J. San Martin
(74) *Attorney, Agent, or Firm* — Westman, Champlin & Koehler, P.A.

(57) ABSTRACT

A piezoelectric sensor assembly, a manufacturing method thereof, a display panel and an electronic device including the same are provided. The piezoelectric sensor assembly includes: a base substrate; a plurality of ultrasonic transducers, wherein a spacing area is provided between two adjacent ultrasonic transducers; and an acoustic matching layer, wherein the acoustic matching layer includes a plurality of (Continued)

acoustic matching areas, and an orthographic projection of at least one acoustic matching area on the base substrate falls into an orthographic projection of the ultrasonic transducer corresponding to the acoustic matching area on the base substrate, wherein an isolation cavity is provided between two adjacent acoustic matching areas.

19 Claims, 13 Drawing Sheets

(56) References Cited

U.S. PATENT DOCUMENTS

| | | | |
|---|---|---|---|
| 9,180,491 | B2 | 11/2015 | Tsuzuki et al. |
| 10,596,598 | B2 * | 3/2020 | Daloz ................... B06B 1/0622 |
| 2006/0186765 | A1 | 8/2006 | Hashimoto |
| 2009/0034370 | A1 * | 2/2009 | Guo ..................... G10K 11/002 |
| | | | 29/25.35 |
| 2013/0293066 | A1 * | 11/2013 | Tsuzuki .............. B32B 38/0004 |
| | | | 310/334 |
| 2014/0070668 | A1 * | 3/2014 | Ona ....................... B06B 1/0629 |
| | | | 29/25.35 |
| 2016/0036412 | A1 * | 2/2016 | Suzuki ................... B06B 1/067 |
| | | | 310/311 |
| 2019/0120624 | A1 | 4/2019 | Piazza et al. |
| 2019/0231310 | A1 | 8/2019 | Osawa |

FOREIGN PATENT DOCUMENTS

| | | |
|---|---|---|
| CN | 107199169 A | 9/2017 |
| CN | 109492501 A | 3/2019 |
| CN | 109530196 A | 3/2019 |
| CN | 109804643 A | 5/2019 |
| CN | 110227640 A | 9/2019 |
| JP | 2005086458 A | 3/2005 |
| JP | 2007235795 A  * | 9/2007 |
| JP | 4396513 B2 | 1/2010 |

* cited by examiner

S60

| forming a first electrode layer on a side of the pore layer away from the base substrate and patterning the first electrode layer to form a plurality of first electrode parts spaced apart from one another | S61 |

↓

| forming a dielectric layer between adjacent first electrode parts, so that an orthographic projection of the dielectric layer on the base substrate falls into orthographic projections of the isolation cavities on the base substrate | S62 |

↓

| forming a piezoelectric material layer on a side of the first electrode parts and the dielectric layer away from the base substrate | S63 |

↓

| depositing a second electrode layer on a side of the piezoelectric material layer away from the base substrate | S64 |

FIG. 7B

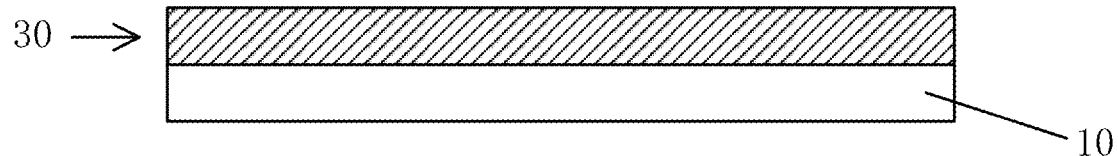

FIG. 8A

PIEZOELECTRIC SENSOR ASSEMBLY AND MANUFACTURING METHOD THEREOF, DISPLAY PANEL AND ELECTRONIC DEVICE

CROSS-REFERENCE TO RELATED APPLICATION

The present application is a Section 371 National Stage Application of International Application No. PCT/CN2020/092089, filed on May 25, 2020, entitled "PIEZOELECTRIC SENSOR ASSEMBLY AND MANUFACTURING METHOD THEREOF, DISPLAY PANEL AND ELECTRONIC DEVICE", which claims the benefit of Chinese Patent Application No. 201910529664.X filed on Jun. 18, 2019 in the China National Intellectual Property Administration, the contents of which are incorporate herein by reference in their entireties.

TECHNICAL FIELD

The present disclosure relates to the field of piezoelectric technology, and in particular to a piezoelectric sensor assembly and a manufacturing method thereof, and a display panel and an electronic device including the piezoelectric sensor assembly.

BACKGROUND

Piezoelectric sensors may detect contact pressure through ultrasonic waves, and may be applied to touch screens, fingerprint recognition, and so on. Generation and detection of ultrasonic waves may be achieved by an ultrasonic transducer. In order to achieve multi-channel information transmission in ultrasonic detection, multiple transducers may generally be provided for simultaneous transmission and reception. There is a phenomenon of ultrasonic crosstalk between multiple ultrasonic transducers. That is, a signal received by an ultrasonic transducer does not come from a matched ultrasonic transducer, but comes from waves emitted by other ultrasonic transducers.

When the piezoelectric sensor is working, ultrasonic waves are radiated from the ultrasonic transducers, and the radiated ultrasonic waves may generate a beam angle, and the beam angle is radiated outward in a profile of a cone shape. As a spacing between targets that need to be identified by a transducer array for the ultrasonic detection is very small, a spacing between the transducers is correspondingly very small. As a result, a transducer may easily receive signals from adjacent transducers, resulting in signal crosstalk.

SUMMARY

Embodiments of the present disclosure provide a piezoelectric sensor assembly, comprising: a base substrate; a plurality of ultrasonic transducers, wherein a spacing area is provided between two adjacent ultrasonic transducers; and an acoustic matching layer, wherein the acoustic matching layer comprises a plurality of acoustic matching areas, and an orthographic projection of at least one acoustic matching area on the base substrate falls into an orthographic projection of the ultrasonic transducer corresponding to the acoustic matching area on the base substrate, wherein an isolation cavity is provided between two adjacent acoustic matching areas.

In some embodiments, the isolation cavity is a vacuum cavity or filled with air.

In some embodiments, the piezoelectric sensor assembly further comprises a pore layer on a side of the acoustic matching layer away from the base substrate.

In some embodiments, the pore layer comprises a porous silicon layer.

In some embodiments, each ultrasonic transducer comprises: a first electrode layer; a piezoelectric material layer on a side of the first electrode layer away from the base substrate; and a second electrode layer on a side of the piezoelectric material layer away from the base substrate.

In some embodiments, the spacing area comprises a dielectric layer between first electrode layers of two adjacent ultrasonic transducers.

In some embodiments, piezoelectric material layers of all the ultrasonic transducers are connected to each other to form an integrity, and second electrode layers of all the ultrasonic transducers are connected to each other to form an integrity.

In some embodiments, the base substrate is located on a side of the acoustic matching layer away from the ultrasonic transducers.

In some embodiments, an acoustic impedance of the acoustic matching layer is between an acoustic impedance of the base substrate and an acoustic impedance of the piezoelectric material layer.

In some embodiments, the acoustic impedance of the acoustic matching layer is a geometric average between the acoustic impedance of the base substrate and the acoustic impedance of the piezoelectric material layer.

In some embodiments, the base substrate is located between the acoustic matching layer and the ultrasonic transducers.

In some embodiments, the piezoelectric sensor assembly further comprises an insulating layer on a side of the acoustic matching layer away from the base substrate.

In some embodiments, the acoustic impedance of the acoustic matching layer is between the acoustic impedance of the base substrate and an acoustic impedance of the insulating layer.

In some embodiments, the acoustic impedance of the acoustic matching layer is a geometric average between the acoustic impedance of the base substrate and the acoustic impedance of the insulating layer.

In some embodiments, a thickness of the acoustic matching layer is a quarter of wavelength of ultrasonic wave emitted by the ultrasonic transducers.

In some embodiments, the piezoelectric sensor assembly further comprises a protective layer on a side of the ultrasonic transducers away from the base substrate.

In some embodiments, the plurality of ultrasonic transducers are arranged in an array on a side of the base substrate.

Embodiments of the present disclosure further provide a display panel, comprising the piezoelectric sensor assembly according to any one of the aforementioned embodiments.

Embodiments of the present disclosure further provide an electronic device, comprising the piezoelectric sensor assembly according to any one of the aforementioned embodiments or the display panel according to any one of the aforementioned embodiments.

Embodiments of the present disclosure further provide a manufacturing method of a piezoelectric sensor assembly, comprising: forming an acoustic matching layer on a base substrate; depositing a pore layer on a side of the acoustic matching layer away from the base substrate; forming a patterned mask layer on a side of the pore layer away from the base substrate to expose positions where isolation cavities will be formed; performing dry etching to allow etching gas to penetrate the pore layer at the positions where isolation cavities will be formed to form isolation cavities in the acoustic matching layer; removing the patterned mask layer; and forming a plurality of ultrasonic transducers on a side of the pore layer away from the base substrate.

In some embodiments, the forming the plurality of ultrasonic transducers on the side of the pore layer away from the base substrate comprises: forming a first electrode layer on the side of the pore layer away from the base substrate and patterning the first electrode layer to form a plurality of first electrode parts spaced apart from each other; forming a dielectric layer between adjacent first electrode parts, wherein an orthographic projection of the dielectric layer on the base substrate falls into orthographic projections of the isolation cavities on the base substrate; forming a piezoelectric material layer on a side of the first electrode parts and the dielectric layer away from the base substrate; and depositing a second electrode layer on a side of the piezoelectric material layer away from the base substrate.

Embodiments of the present disclosure further provide a manufacturing method of a piezoelectric sensor assembly, comprising: forming a plurality of ultrasonic transducers on a base substrate; forming an acoustic matching layer on a side of the base substrate away from the plurality of ultrasonic transducers; depositing a pore layer on a side of the acoustic matching layer away from the base substrate; forming a patterned mask layer on a side of the pore layer away from the base substrate to expose positions where isolation cavities will be formed; performing dry etching to allow etching gas to penetrate the pore layer at the positions where isolation cavities will be formed to form isolation cavities in the acoustic matching layer; removing the patterned mask layer; and forming an insulating layer on a side of the pore layer away from the base substrate.

In some embodiments, the forming the plurality of ultrasonic transducers on the base substrate comprises: forming a first electrode layer on a side of the base substrate and patterning the first electrode layer to form a plurality of first electrode parts spaced apart from each other; forming a dielectric layer between adjacent first electrode parts, wherein an orthographic projection of the dielectric layer on the base substrate falls into orthographic projections of the isolation cavities on the base substrate; forming a piezoelectric material layer on a side of the first electrode parts and the dielectric layer away from the base substrate; and depositing a second electrode layer on a side of the piezoelectric material layer away from the base substrate.

BRIEF DESCRIPTION OF THE DRAWINGS

In order to explain technical solutions of the embodiments of the present disclosure more clearly, drawings of the embodiments will be briefly described below. It should be understood that the drawings described below only refer to some embodiments of the present disclosure, not to limit the present disclosure, wherein:

FIG. 7B shows an exemplary sub-step of step S60 in FIG. 7A;

FIG. 8A to FIG. 8G schematically show structures obtained in various steps of a manufacturing method of a piezoelectric sensor assembly according to embodiments of the present disclosure;

DETAILED DESCRIPTION OF EMBODIMENTS

Figure 1:
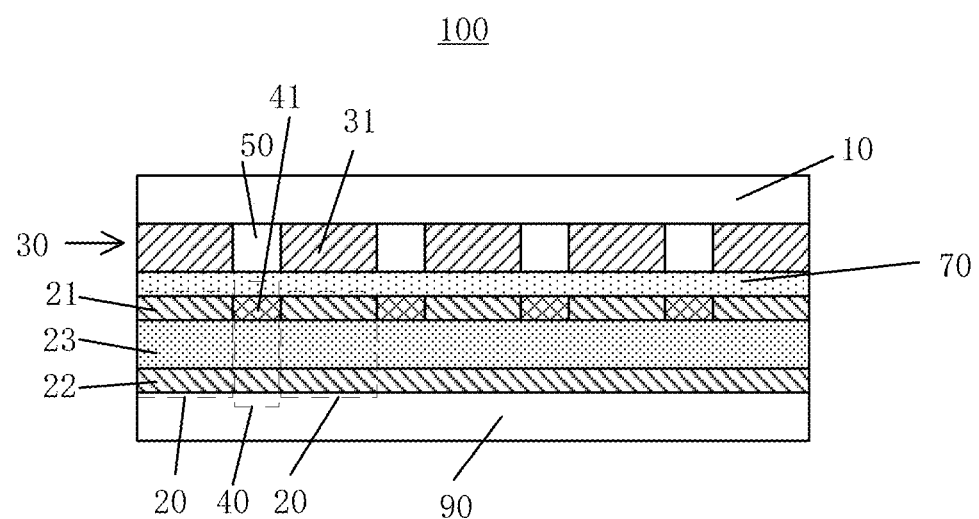
FIG. 1 shows a schematic view of a structure of a piezoelectric sensor assembly according to embodiments of the present disclosure.

In order to make objectives, technical solutions, and advantages of the embodiments of the present disclosure clearer, the embodiments of the present disclosure will be described below in detail in conjunction with accompanying drawings. It should be understood that the following description of the embodiments is intended to explain and illustrate the general concept of the present disclosure, and should not be construed as limiting the present disclosure. In the specification and drawings, the same or similar reference numerals refer to the same or similar parts or components. For clarity, the drawings are not necessarily drawn to scale, and some well-known components and structures may be omitted from the drawings.

Unless otherwise defined, the technical terms or scientific terms used in the present disclosure shall have the usual meanings understood by those skilled in the art to which the disclosure belongs. Terms such as "first", "second" and similar words used in the present disclosure do not indicate any order, quantity, or importance, but are only configured to distinguish different components. Words such as "a" or "an" do not exclude plural form. Words such as "include", "comprise" and other similar words mean that the element or item appearing before the words encompasses the element or item listed after the words and its equivalents, but does not exclude other elements or items. Words such as "connect" or "couple" and other similar words are not limited to physical or mechanical connections, but may include electrical connections, whether directly or indirectly. Words such as "up", "down", "left", "right", "top" or "bottom", or the like are only configured to indicate relative position relationship. When an absolute position of the described object changes, the relative position relationship may also be correspondingly changed. When an element such as a layer, film, region or substrate is referred to as being "on" or "under" another element, the element may be "directly" "on" or "under" the another element, or there may be intermediate elements.

FIG. 1 schematically shows a piezoelectric sensor assembly 100 according to embodiments of the present disclosure. The piezoelectric sensor assembly 100 includes a base substrate 10, a plurality of ultrasonic transducers 20 and an acoustic matching layer 30. A spacing area 40 is provided between two adjacent ultrasonic transducers 20 to space apart the adjacent ultrasonic transducers 20. The acoustic matching layer 30 may include a plurality of acoustic matching areas 31. The plurality of acoustic matching areas 31 are arranged corresponding to the plurality of ultrasonic transducers 20. An orthographic projection of each acoustic matching area 31 on the base substrate 10 falls into an orthographic projection of the ultrasonic transducer 20 corresponding to the acoustic matching area 31 on the base substrate 10. It should be noted that, in the embodiments of the present disclosure, it is not necessary that orthographic projections of all acoustic matching areas 31 on the base substrate 10 fall into orthographic projections of the ultrasonic transducers 20 corresponding to the acoustic matching areas 31 on the base substrate 10. For example, orthographic projections of at least one, at least two, at least three or more ones of the acoustic matching areas 31 on the base substrate 10 may fall into orthographic projections of the ultrasonic transducer 20 corresponding to the acoustic matching areas 31 on the base substrate 10. An isolation cavity 50 is provided between two adjacent acoustic matching regions 31. In some embodiments, the isolation cavity 50 may be a vacuum cavity or filled with air. The isolation cavity 50 may be configured to suppress signal interference between the ultrasonic transducers 20 to improve the signal-to-noise ratio. The working principle of the isolation cavity 50 will be introduced below in conjunction with FIG. 5 and FIG. 6.

Figure 5:
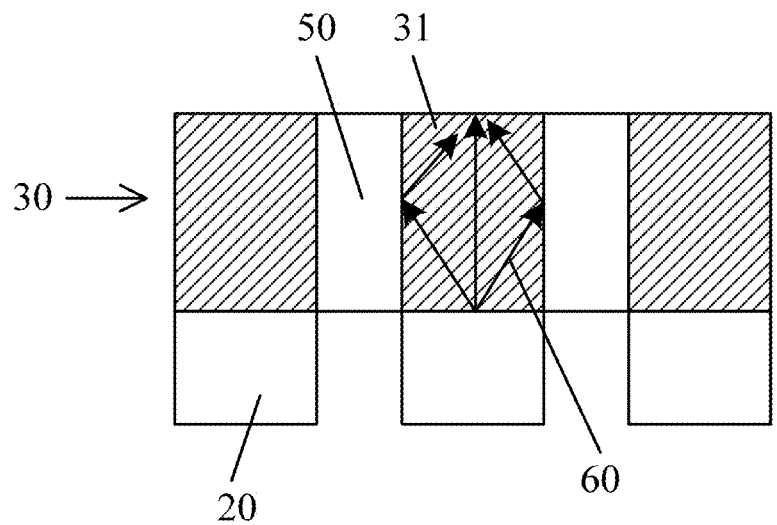
FIG. 5 schematically shows a sonic wave transmission path in an ultrasonic emission stage of an ultrasonic transducer of a piezoelectric sensor assembly according to embodiments of the present disclosure.

The ultrasonic transducer 20 may be configured to emit ultrasonic waves and receive and process ultrasonic waves reflected by an object, so as to detect the object. FIG. 5 schematically shows a sonic wave transmission path in an ultrasonic emission stage of the ultrasonic transducer 20 of the piezoelectric sensor assembly 100 according to embodiments of the present disclosure. For the sake of clarity, the specific structure of the ultrasonic transducer 20 is not shown in detail in FIGS. 5 and 6. The ultrasonic transducer 20 emits ultrasonic waves 60, and after the ultrasonic waves 60 enter the acoustic matching area 31 in the acoustic matching layer 30, they may be reflected on an interface between the acoustic matching area 31 and the isolation cavity 50. Since acoustic impedance of a medium (such as vacuum or air) in the isolation cavity 50 is much smaller than acoustic impedance of the acoustic matching layer 30 (acoustic matching area 31), therefore, according to the principle of acoustics, reflectivity of the ultrasonic waves at the interface between the acoustic matching area 31 and the isolation cavity 50 is close to 1. In other words, most of the ultrasonic waves 60 may not enter the isolation cavity 50 through the interface between the acoustic matching area 31 and the isolation cavity 50. In this way, the ultrasonic waves 60 emitted from one ultrasonic transducer 20 may be prevented from being transmitted to other ultrasonic transducers 20 to cause signal interference.

Figure 6:
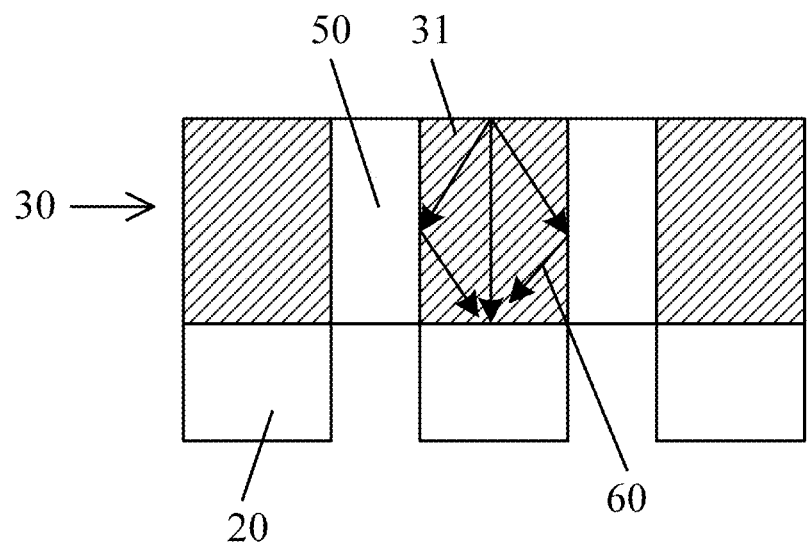
FIG. 6 schematically shows a sonic wave transmission path in an ultrasonic receiving stage of an ultrasonic transducer of a piezoelectric sensor assembly according to embodiments of the present disclosure.

FIG. 6 schematically shows a sonic wave transmission path in an ultrasonic receiving stage of the ultrasonic transducer 20 of the piezoelectric sensor assembly 100 according to embodiments of the present disclosure. Similar to the sonic wave transmission path in the ultrasonic emission stage shown in FIG. 5, the ultrasonic waves 60 may return to the original acoustic matching area 31 after being reflected by the object, and may be again reflected at the interface between the acoustic matching area 31 and the isolation cavity 50, then may be received by the ultrasonic transducer 20 that emits the ultrasonic waves 60.

In the embodiments of the present disclosure, due to the isolation cavity 50, most of the ultrasonic waves 60 emitted from one ultrasonic transducer 20 may be difficult to enter the other ultrasonic transducers 20. Therefore, the signal interference between the ultrasonic transducers 20 may be prevented.

For the interface between the acoustic matching area 31 and the isolation cavity 50, the reflectivity r of ultrasonic waves may be calculated according to the following formula (1):

$$r = \left|\frac{R_1 - R_2}{R_1 + R_2}\right|, \quad (1)$$

wherein R1 is the acoustic impedance of the acoustic matching layer 30 (acoustic matching area 31), and R2 is the acoustic impedance of the medium in the isolation cavity 50. When a difference between R1 and R2 is large, the reflectivity r of the ultrasonic waves at the interface between the acoustic matching area 31 and the isolation cavity 50 may approach 1. As an example, the acoustic impedance of the material of the acoustic matching layer 30 may be from $4 \times 10^6$ Pa*s/m to $15 \times 10^6$ Pa*s/m, and the acoustic impedance of the medium (such as air) in the isolation cavity 50 may be, for example, $0.0004 \times 10^6$ Pa*s/m, the two acoustic impedances may be very different.

In some embodiments, in order to better form and support the isolation cavity 50, the piezoelectric sensor assembly 100 may further include a pore layer 70, such as a porous silicon layer. The pore layer 70 may be located on a side of the acoustic matching layer 30 away from the base substrate 10. During manufacturing the piezoelectric sensor assembly 100, pores in the pore layer 70 may allow etching gas to enter a structure (for example, the acoustic matching layer 30) covered by the pore layer 70 to etch the structure. In this way, multiple cavities may be etched out in the acoustic matching layer 30 covered by the pore layer 70, so as to be used as isolation cavities. As shown in FIG. 1, the base substrate 10, the pore layer 70 and adjacent acoustic matching areas 31 together define an isolation cavity 50. Therefore, the pore layer 70 is very helpful for forming the isolation cavity 50.

In some embodiments, each ultrasonic transducer 20 may include a first electrode layer 21, a second electrode layer 22, and a piezoelectric material layer 23 between the first electrode layer 21 and the second electrode layer 22. For example, the first electrode layer 21 may be closer to the base substrate 10 than the second electrode layer 22. In some embodiments, the piezoelectric material layer 23 is mainly formed of a polymer film that is easy to be processed, including but not limited to polyvinylidene fluoride (PVDF), polyvinylidene difluoride trifluoroethylene (PVDF-TrFE), and the like. The thickness of the piezoelectric material layer 23 is, for example, about 5~15 μm. As an example, the first electrode layer 21 may be a transparent electrode, for example, made of indium tin oxide (ITO), and the second electrode layer 22 may be a metal electrode. However, the embodiments of the present disclosure are not limited thereto, and the first electrode layer 21 and the second electrode layer 22 may also be made of any other materials known in the art.

In some embodiments of the present disclosure, there is a spacing area 40 between two adjacent ultrasonic transducers 20, but it does not mean that all layers in the two ultrasonic transducers 20 must be physically separated. For example, in the embodiments shown in FIG. 1, only the first electrode layers 21 in the adjacent ultrasonic transducers 20 are separated from each other, and the piezoelectric material layers 23 and the second electrode layers 22 in the adjacent ultrasonic transducers 20 are respectively connected to each other to form an integrity. As the first electrode layer 21, the second electrode layer 22, and the piezoelectric material layer 23 need to cooperate with one another in order to make the ultrasonic transducer 20 work normally, the adjacent ultrasonic transducers 20 are separated from each other by separating the first electrode layers 21. As shown in FIG. 1, each of the ultrasonic transducers 20 which are separated from one another may include a laminated structure (or referred to as a piezoelectric sandwiched structure) including the first electrode layer 21, the piezoelectric material layer 23, and the second electrode layer 22, as indicated by the dashed box. The piezoelectric material layer 23 is located on a side of the first electrode layer 21 away from the base substrate 10, and the second electrode layer 22 is located on a side of the piezoelectric material layer 23 away from the base substrate 10.

Figure 2:
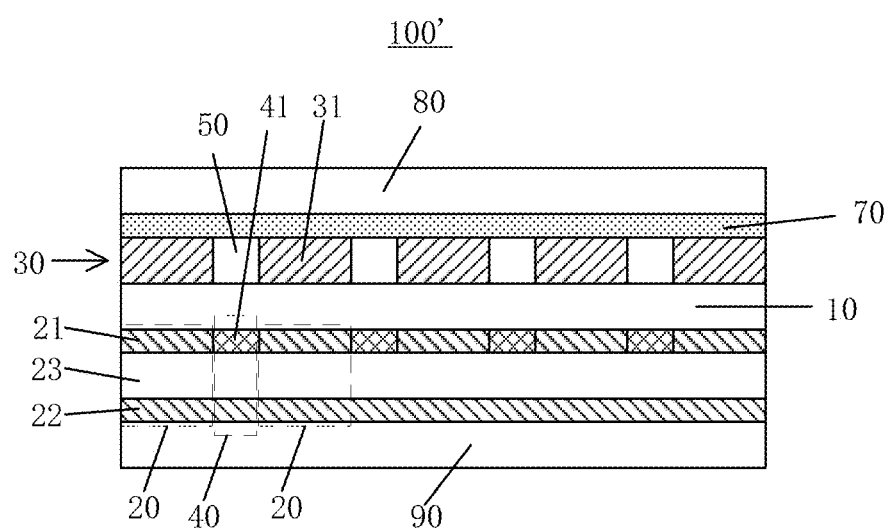
FIG. 2 shows a schematic view of a structure of another piezoelectric sensor assembly according to embodiments of the present disclosure.

In some embodiments, as shown in FIGS. 1 and 2, the piezoelectric material layers 23 in all the ultrasonic transducers 20 may be integrally formed from the same material layer, or connected to each other to form an integrity. Similarly, the second electrode layers 22 in all the ultrasonic transducers 20 may also be integrally formed by the same conductive layer, or connected to each other to form an integrity. However, the embodiments of the present disclosure are not limited thereto. For example, the piezoelectric material layers 23 in two adjacent ultrasonic transducers 20 may also be separated from each other; similarly, the second electrode layers 22 in two adjacent ultrasonic transducers 20 may also be separated from each other.

In some embodiments, the spacing area 40 between two adjacent ultrasonic transducers 20 includes a dielectric layer 41 disposed between the first electrode layers 21 of two adjacent ultrasonic transducers 20. The dielectric layer 41 may be made of materials such as $SiN_x$ and SiO. The dielectric layer 41 is configured to separate the first electrode layers 21 of two adjacent ultrasonic transducers 20, so as to separate the two adjacent ultrasonic transducers 20. In some embodiments, the dielectric layers 41 and the isolation cavities 50 are in one-to-one correspondence. In order to make the isolation cavity 50 suppress the mutual signal interference between the ultrasonic transducers 20 better, the isolation cavities 50 may cover the corresponding dielectric layers 41, that is, orthographic projections of the dielectric layers 41 on the base substrate 10 fall into orthographic projections of the isolation cavities 50 on the base substrate 10, respectively. In some embodiments, a width of the dielectric layer 41 (in the left-right direction in FIG. 1) between the first electrode layers 21 of two adjacent ultrasonic transducers 20 (or a distance between the first electrode layers 21 of two adjacent ultrasonic transducers 20) may be in a range of 10 to 20 μm, and a width of the first electrode layer 21 of each ultrasonic transducer 20 (in the left-right direction in FIG. 1) may be in a range of 60 to 70 μm.

In some embodiments, the plurality of ultrasonic transducers 20 are arranged in an array on one side of the base substrate 10. Each ultrasonic transducer 20 may be referred to as a transducer pixel. A distance between two adjacent ultrasonic transducers 20 is generally smaller than a size of the object to be identified (for example, a human fingerprint, etc.), so as to ensure a resolution of the object to be identified. This may be designed according to actual work requirements.

In the embodiments of the present disclosure, the base substrate 10 may include, for example, a glass substrate or a back plate made of materials such as plastic or resin. In the embodiments as shown in FIG. 1, the base substrate 10 is located on a side of the acoustic matching layer 30 away from the ultrasonic transducer 20. In this way, the acoustic matching layer 30 and the ultrasonic transducer 20 are located on the same side of the base substrate 10, therefore, the acoustic matching layer 30 may be closer to the ultrasonic transducer 20, which is beneficial to improve utilization efficiency of ultrasonic waves.

In some embodiments, as shown in FIG. 1, the acoustic impedance of the acoustic matching layer 30 may be between the acoustic impedance of the base substrate 10 and the acoustic impedance of the piezoelectric material layer 23, thereby achieving good ultrasonic propagation efficiency. In order to further improve the ultrasonic propagation efficiency, the acoustic impedance of the acoustic matching layer 30 may be set to a geometric average between the acoustic impedance of the base substrate 10 and the acoustic impedance of the piezoelectric material layer 23. Although there are the pore layer 70 and the first electrode layer 21 between the acoustic matching layer 30 and the piezoelectric material layer 23 in the example of FIG. 1, the thickness of the pore layer 70 and the thickness of the first electrode layer 21 are relatively small, for example, the pore layer 70 is a porous silicon layer with a thickness of 0.5 μm-5 μm, and the thickness of the first electrode layer may be, for example, 1 micron to several microns or even less than 1 micron. Therefore, they may be ignored when considering the acoustic effect. According to the principle of acoustics, when ultrasonic waves are perpendicularly incident on a thin layer with different acoustic impedances on both sides of the medium (in the example of FIG. 1, the acoustic matching layer 30 may be regarded as such a thin layer, and the medium on both sides may be the base substrate 10 and the piezoelectric material layer 23 (ignoring the very thin pore layer 70 and first electrode layer 21), if the thickness is equal to an odd multiple of a quarter of the wavelength of the ultrasonic waves passing through the thin layer, the transmittance is equal to 1, so that the ultrasonic waves are totally transmitted. In some embodiments of the present disclosure, the thickness of the acoustic matching layer 30 is set to be a quarter of the wavelength of the ultrasonic wave passing through it, so as to ensure that the overall thickness of the structure is not too large. Also, the acoustic impedance of the selected material of the acoustic matching layer may be, for example, the geometric average between the acoustic impedance of the back glass and the acoustic impedance of the piezoelectric material, and it is generally between $4\times10^6$ Pa*s/m and $15\times10^6$ Pa*s/m. The acoustic impedance of the air in the isolation cavity 50 is about $0.0004\times10^6$ Pa*s/m (if the isolation cavity 50 has a vacuum, the acoustic impedance is lower), and it is much smaller than the acoustic impedance of a typical acoustic matching layer.

The above-mentioned structure may not only ensure that the ultrasonic waves have a high transmission efficiency when they propagate in the acoustic matching layer 30, but also may prevent the ultrasonic waves emitted by different ultrasonic transducers from passing through the isolation cavities to cause mutual interference.

Figure 3:
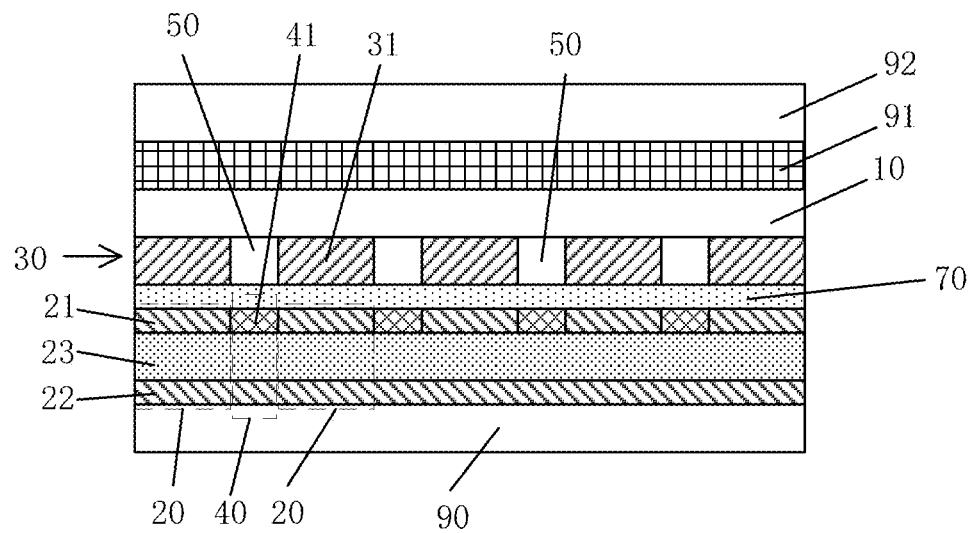
FIG. 3 schematically shows a schematic view of a structure of a display panel according to embodiments of the present disclosure.

FIG. 3 schematically shows a schematic view of a structure of a display panel 200 according to embodiments of the present disclosure. The display panel 200 includes the piezoelectric sensor assembly 100 as shown in FIG. 1. The display panel 200 may be an organic light emitting diode (OLED) display panel. In this case, the display panel 200 may further include an organic light emitting diode assembly 91 located on a side of the base substrate 10 away from the ultrasonic transducer 20 and a cover glass 92 located on a side of the organic light emitting diode assembly 91 away from the base substrate 10.

FIG. 2 shows a schematic view of a structure of another piezoelectric sensor assembly 100' according to embodiments of the present disclosure. The embodiments shown in FIG. 2 are different from the embodiments shown in FIG. 1 mainly in that the base substrate 10 is located between the acoustic matching layer 30 and the ultrasonic transducer 20. In other words, in the embodiments shown in FIG. 2, the acoustic matching layer 30 and the ultrasonic transducer 20 are respectively located on opposite sides of the base substrate 10 instead of being located on the same side. In some embodiments, the piezoelectric sensor assembly 100' further includes an insulating layer 80, and the acoustic matching layer 30 is located between the base substrate 10 and the insulating layer 80. In other words, the insulating layer 80 may be located on a side of the acoustic matching layer 30 away from the base substrate.

Correspondingly, the pore layer 70 may be located between the insulating layer 80 and the acoustic matching layer 30. With this structure, the ultrasonic transducer 20 (including the first electrode layer 21 as well as the thin film transistor (if necessary) and other structures) may be directly formed on the base substrate (for example, back glass) 10, which is beneficial to simplify the process. In some embodiments, the insulating layer 80 may be, for example, an adhesive layer, a substrate (for example, a substrate of an OLED), or an encapsulation layer.

In the embodiments shown in FIG. 2, the acoustic impedance of the acoustic matching layer 30 may be between the acoustic impedance of the base substrate 10 and the acoustic impedance of the insulating layer 80. In order to further improve the propagation efficiency of ultrasonic waves in the acoustic matching layer 30, the acoustic impedance of the acoustic matching layer 30 may be the geometric average between the acoustic impedance of the base substrate 10 and the acoustic impedance of the insulating layer 80. Similar to the embodiments shown in FIG. 1, in the embodiments shown in FIG. 2, the thickness of the acoustic matching layer 30 may also be a quarter of the wavelength of the ultrasonic waves passing through it, so as to ensure that the overall thickness of the structure is not too large.

In some embodiments, the piezoelectric sensor assembly 100' may further include a protective layer 90. The protective layer 90 may be located on a side of the ultrasonic transducer 20 away from the base substrate 10. The protective layer 90 may be configured to protect the ultrasonic transducer 20 from the pollution of external environment (for example, a solution, etc.).

Figure 4:
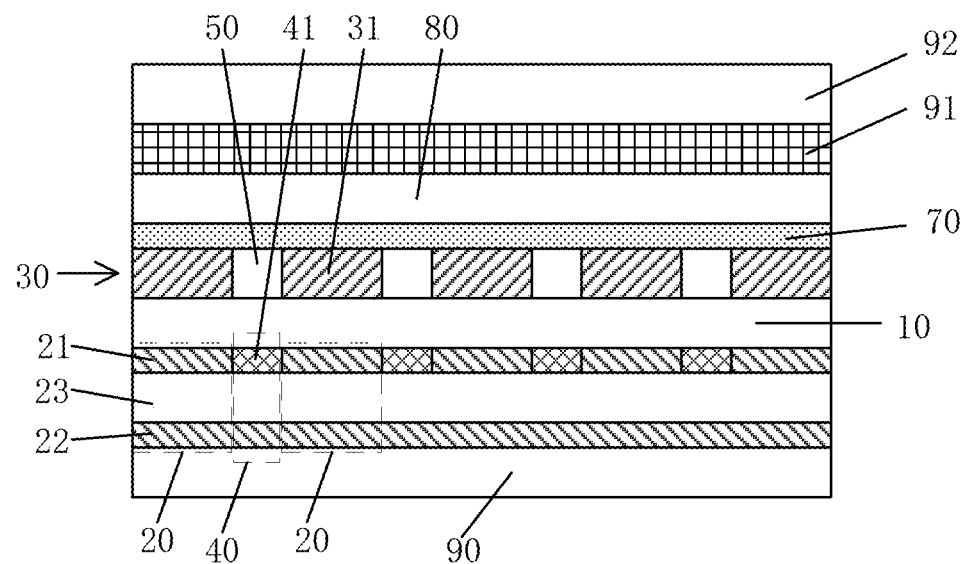
FIG. 4 schematically shows a schematic view of a structure of another display panel according to embodiments of the present disclosure.

FIG. 4 schematically shows a schematic view of a structure of a display panel 200' according to embodiments of the present disclosure. The display panel 200' includes the piezoelectric sensor assembly 100' as shown in FIG. 2. The display panel 200' may be an organic light emitting diode (OLED) display panel. In this case, the display panel 200' may also include an organic light emitting diode assembly 91 located on a side of the insulating layer 80 away from the ultrasonic transducer 20, and a cover glass 92 located on a side of the organic light emitting diode assembly 91 away from the insulating layer 80.

In the embodiments of the present disclosure, the material of the acoustic matching layer 30 may include, for example, epoxy resin including a filler for adjusting acoustic impedance. The filler includes but is not limited to doped tungsten, tungsten oxide, iron oxide, titanium dioxide, silicon dioxide, talc and the like.

In the embodiments of the present disclosure, for example, the organic light emitting diode assembly 91 may include an organic light emitting diode device. The device may include, for example, an anode, a cathode, and an organic light-emitting material layer between the anode and the cathode. As an example, the device may also include a hole injection layer, a hole transport layer, an electron transport layer, an electron injection layer, etc., to improve luminous efficiency. However, the embodiments of the present disclosure are not limited thereto, and other known organic light emitting diode devices may also be used.

In the embodiments of the present disclosure, the display panels 200, 200' are not limited to OLED display panels, and may also be other known types of display panels.

Figure 7A:
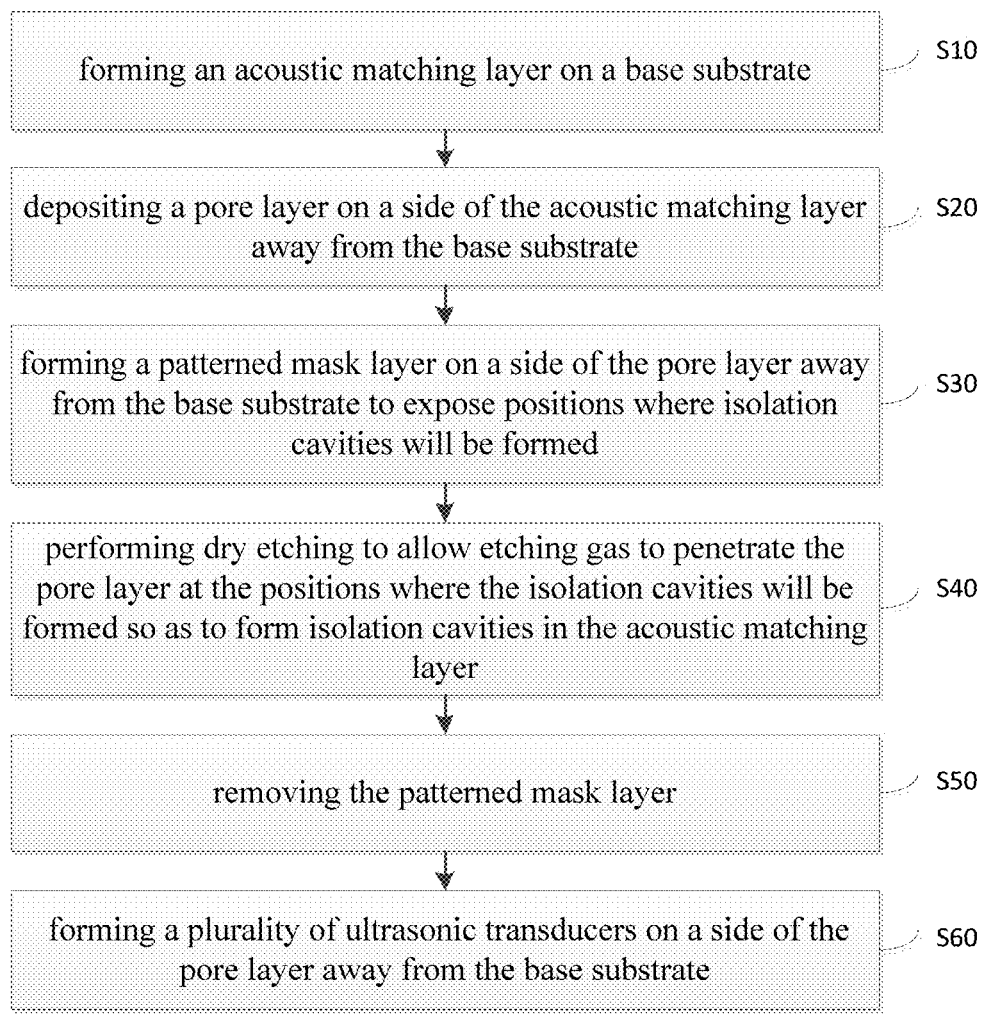
FIG. 7A shows a flowchart of a manufacturing method of a piezoelectric sensor assembly according to embodiments of the present disclosure.

The embodiments of the present disclosure also provide a manufacturing method S100 of the piezoelectric sensor assembly. FIG. 7A shows a flowchart of the manufacturing method S100. FIG. 8A to FIG. 8G schematically show structures obtained in various steps of the manufacturing method. The manufacturing method S100 includes:

step S10: forming an acoustic matching layer 30 on a base substrate 10;

step S20: depositing a pore layer 70 on a side of the acoustic matching layer 30 away from the base substrate 10;

step S30: forming a patterned mask layer 71 on a side of the pore layer 70 away from the base substrate 10 to expose positions 72 where isolation cavities will be formed;

step S40: performing dry etching to allow etching gas to penetrate the pore layer 70 at the positions 72 where the isolation cavities will be formed so as to form isolation cavities 50 in the acoustic matching layer 30;

step S50: removing the patterned mask layer 71; and step S60: forming a plurality of ultrasonic transducers 20 on a side of the pore layer 70 away from the base substrate 10.

Figure 8B:
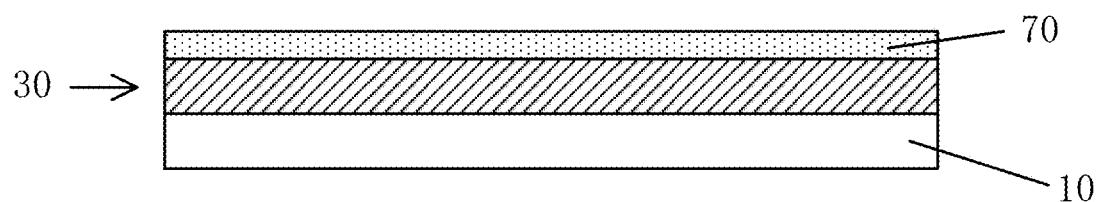
Figure 8C:
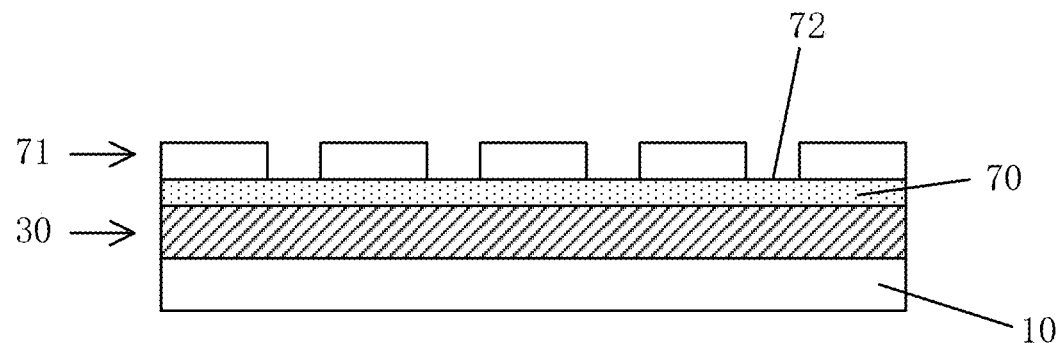
Figure 8D:
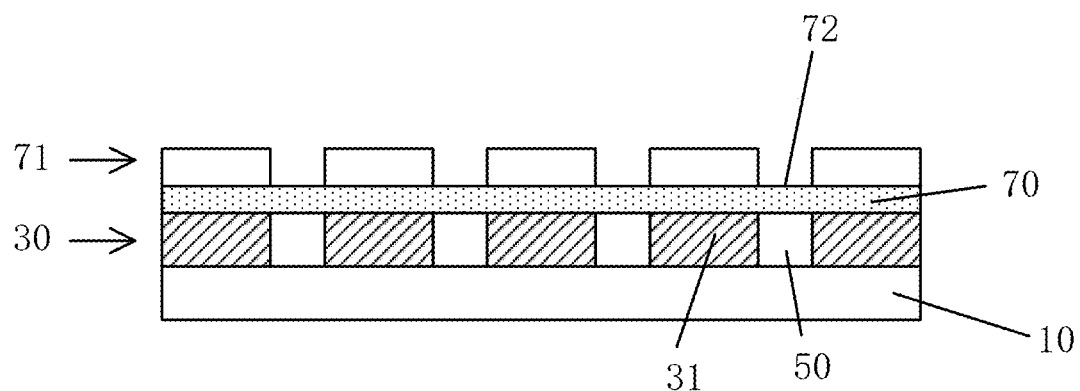
Figure 8E:
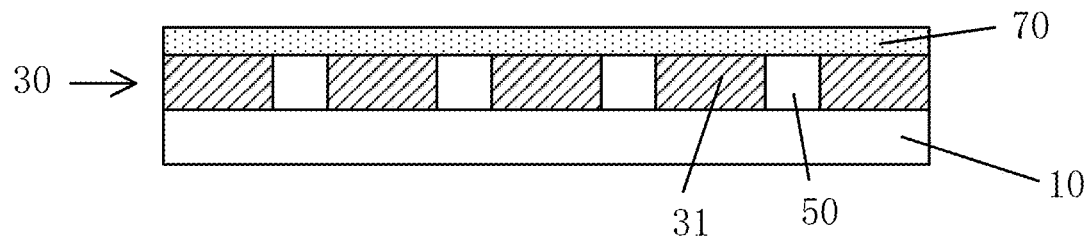

In some embodiments, in the step S10, as shown in FIG. 8A, a material of the acoustic matching layer may be spin-coated on the base substrate 10 (for example, back glass), with a thickness of, for example, a quarter wavelength of ultrasonic waves to be used. The material of the acoustic matching layer 30 may include, for example, epoxy resin including a filler for adjusting acoustic impedance. The filler includes but is not limited to doped tungsten, tungsten oxide, iron oxide, titanium dioxide, silicon dioxide, talc and the like. In the step S20, as shown in FIG. 8B, the pore layer 70 may be a porous silicon layer with a thickness between 0.5 µm and 5 µm, so as to ensure that the thickness of the porous silicon layer does not affect the transmission of the ultrasonic waves. In the step S30, as shown in FIG. 8C, the patterned mask layer 71 may be formed by providing (for example, coating) a photosensitive resist (photoresist) layer on the side of the pore layer 70 away from the base substrate 10 and patterning the photoresist layer. Positions 72 where isolation cavities will be formed are positions in the pore layer 70 corresponding to the isolation cavities 50 to be formed. For example, orthographic projections of positions 72 where isolation cavities will be formed on the base substrate are substantially consistent with orthographic projections of finally-formed isolation cavities 50 on the base substrate. In the step S40, as shown in FIG. 8D, the etching gas may penetrate the pore layer 70 through these positions in the pore layer 70 to etch (for example, by reacting with the acoustic matching layer 30) the acoustic matching layer 30 so as to form the isolation cavities 50. In the step S50, as shown in FIG. 8E, the patterned mask layer 71 (for example, photosensitive resist (photoresist)) may be removed by a peeling process known in the art.

In some embodiments, as shown in FIG. 7B, the above step S60 may include:

sub-step S61: forming a first electrode layer 21 on a side of the pore layer 70 away from the base substrate 10 and patterning the first electrode layer 21 to form a plurality of first electrode parts spaced apart from one another;

sub-step S62: forming a dielectric layer 41 between adjacent first electrode parts, so that an orthographic projection of the dielectric layer 41 on the base substrate 10 falls into orthographic projections of the isolation cavities 50 on the base substrate 10;

sub-step S63: forming a piezoelectric material layer 23 on a side of the first electrode parts and the dielectric layer 41 away from the base substrate 10; and sub-step S64: depositing a second electrode layer 22 on a side of the piezoelectric material layer 23 away from the base substrate 10.

Figure 8F:
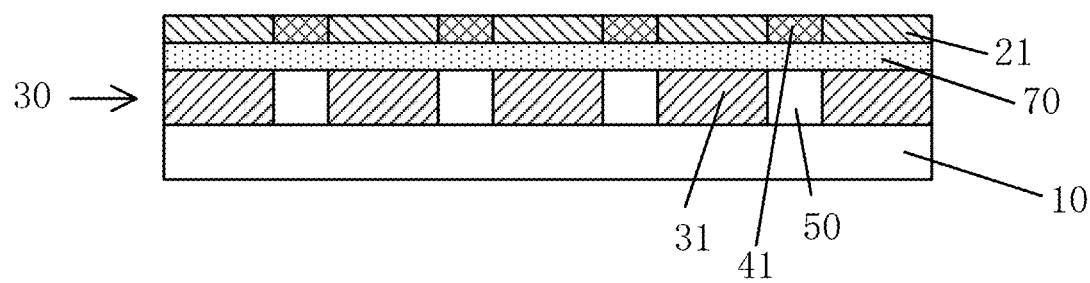
Figure 8G:
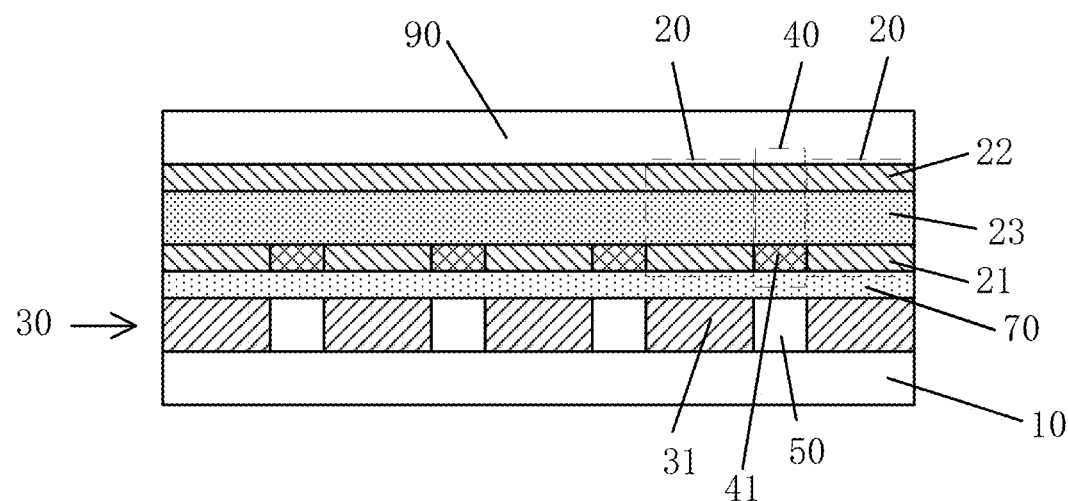

In the sub-step S61, as shown in FIG. 8F, the first electrode layer 21 may be, for example, an ITO layer, which may be deposited on the pore layer 70 by evaporation or the like. In the sub-step S63, as shown in FIG. 8G, a piezoelectric material may be spin-coated on a surface of the first electrode layer 21 (the piezoelectric material includes but is not limited to a thin film containing polyvinylidene fluoride (PVDF), polyvinylidene difluoride trifluoroethylene (PVDF-TrFE), and the like), and the piezoelectric material is polarized to have piezoelectric characteristic. The thickness of the piezoelectric material layer 23 may be, for example, between 5 μm and 15 μm. In the sub-step S64, the second electrode layer 22 may be deposited on a surface of the piezoelectric material layer 23. The second electrode layer 22 is, for example, a metal electrode layer (such as a metal such as molybdenum, platinum, copper, or silver). The thickness of the second electrode layer 22 may be, for example, between 15 μm and 20 μm.

In addition to the above steps and sub-steps, in some embodiments, the manufacturing method may further include: providing a protective layer on a side of the second electrode layer 22 away from the base substrate 10 to seal and protect the ultrasonic transducer 20. A material of the protective layer may be epoxy resin, and the protective layer may be formed by attaching or spin-coating epoxy resin on a surface of the second electrode layer 22 away from the base substrate 10.

Figure 9A:
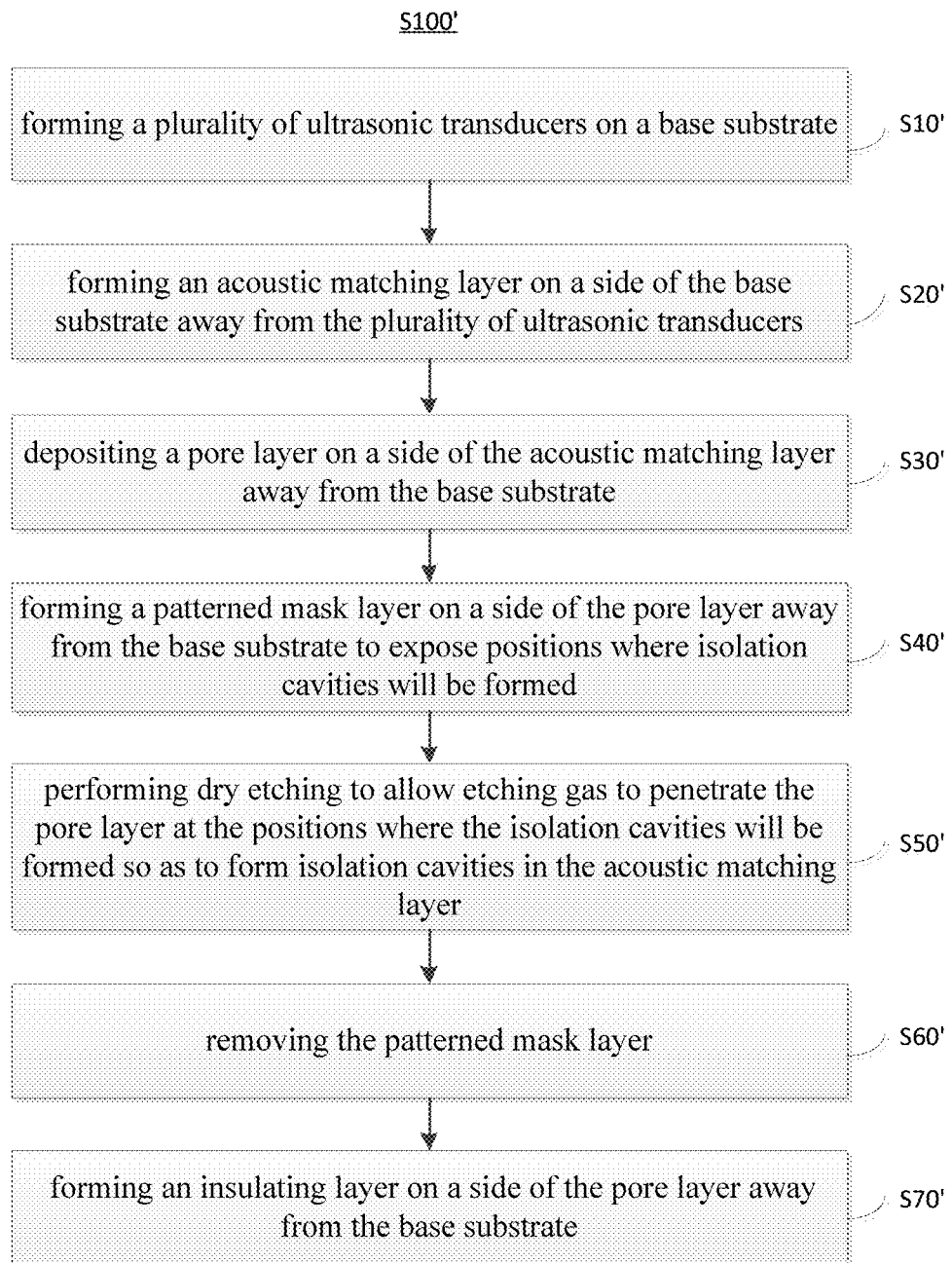
FIG. 9A shows a flowchart of another manufacturing method of a piezoelectric sensor assembly according to embodiments of the present disclosure.

The embodiments of the present disclosure also provide another manufacturing method S100' of the piezoelectric sensor assembly. FIG. 9A shows a flowchart of the manufacturing method S100'. FIG. 10A to FIG. 10H schematically show structures obtained in various steps of the manufacturing method S100'. The manufacturing method S100' may include:

step S10': forming a plurality of ultrasonic transducers 20 on a base substrate 10;

step S20': forming an acoustic matching layer 30 on a side of the base substrate 10 away from the plurality of ultrasonic transducers 20;

step S30': depositing a pore layer 70 on a side of the acoustic matching layer 30 away from the base substrate 10;

step S40': forming a patterned mask layer 71 on a side of the pore layer 70 away from the base substrate 10 to expose positions 72 where isolation cavities will be formed;

step S50': performing dry etching to allow etching gas to penetrate the pore layer 70 at the positions 72 where the isolation cavities will be formed so as to form isolation cavities 50 in the acoustic matching layer 30;

step S60': removing the patterned mask layer 71; and step S70': forming an insulating layer 80 on a side of the pore layer 70 away from the base substrate 10.

Figure 9B:
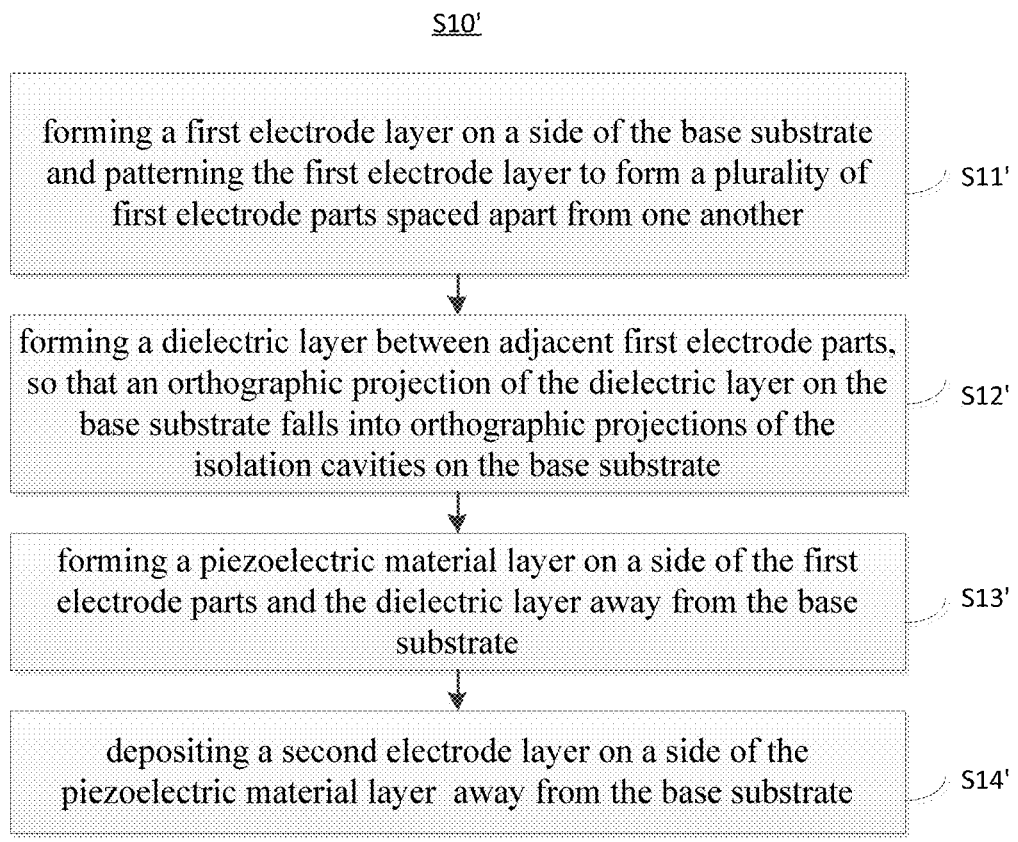
FIG. 9B shows an exemplary sub-step of step S10' in FIG. 9A.
Figure 10A:
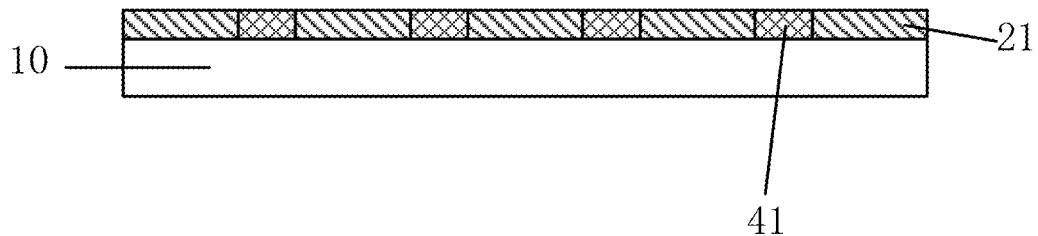
FIG. 10A to FIG. 10H schematically show structures obtained in various steps of another manufacturing method of a piezoelectric sensor assembly according to embodiments of the present disclosure.

In the step S10', as shown in FIG. 10A, the plurality of ultrasonic transducers 20 may be formed on the base substrate 10 (for example, back glass). Specifically, in some embodiments, as shown in FIG. 9B, the step S10' may include:

sub-step S11': forming a first electrode layer 21 on a side of the base substrate 10 and patterning the first electrode layer 21 to form a plurality of first electrode parts spaced apart from one another;

sub-step S12': forming a dielectric layer 41 between adjacent first electrode parts, so that an orthographic projection of the dielectric layer 41 on the base substrate 10 falls into orthographic projections of the isolation cavities 50 on the base substrate 10;

sub-step S13': forming a piezoelectric material layer 23 on a side of the first electrode parts and the dielectric layer 41 away from the base substrate 10; and sub-step S14': depositing a second electrode layer 22 on a side of the piezoelectric material layer 23 away from the base substrate 10.

Figure 10B:
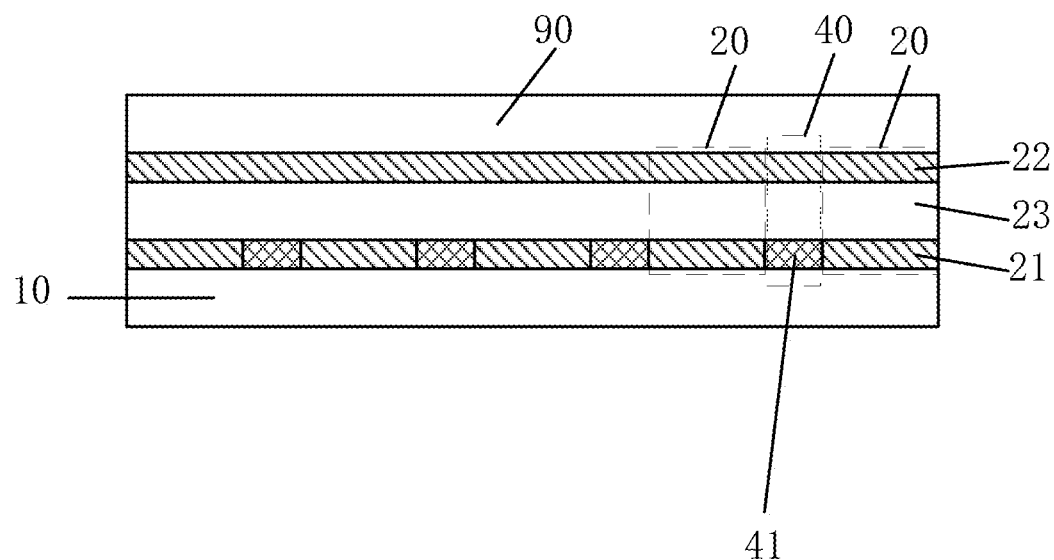

In the sub-step S11', as shown in FIG. 10A, the first electrode layer 21 may be, for example, an ITO layer, which may be deposited on the base substrate 10 by evaporation or the like. In the sub-step S13', as shown in FIG. 10B, a piezoelectric material may be spin-coated on a surface of the first electrode layer 21 (the piezoelectric material includes but is not limited to a thin film containing polyvinylidene fluoride (PVDF), polyvinylidene difluoride trifluoroethylene (PVDF-TrFE), and the like), and the piezoelectric material is polarized to have piezoelectric characteristic. The thickness of the piezoelectric material layer 23 may be, for example, between 5 μm and 15 μm. In the sub-step S14', the second electrode layer 22 may be deposited on a surface of the piezoelectric material layer 23. The second electrode layer 22 is, for example, a metal electrode layer (such as a metal such as molybdenum, platinum, copper, or silver). The thickness of the second electrode layer 22 may be, for example, between 15 μm and 20 μm.

Figure 10C:
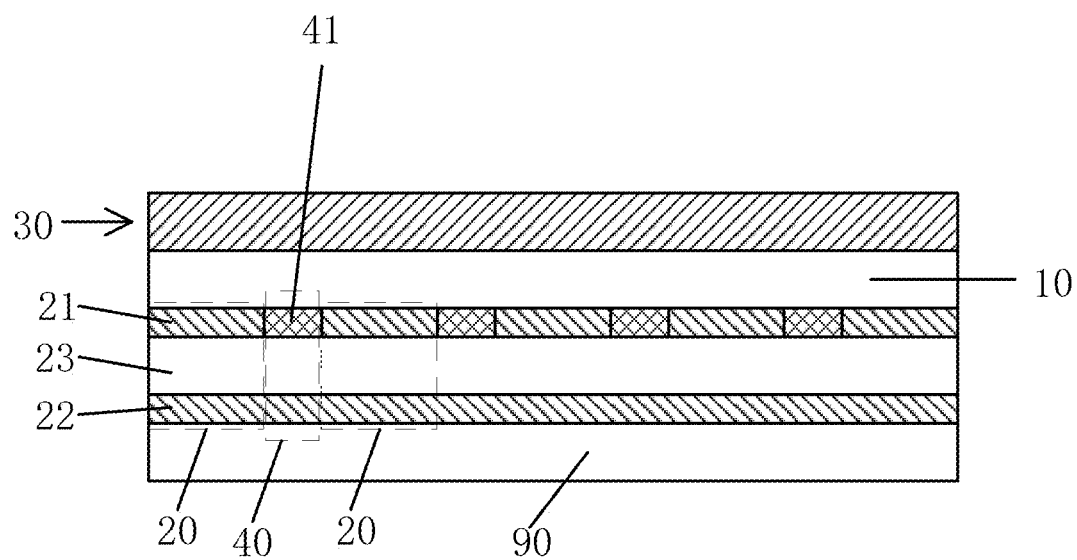
Figure 10D:
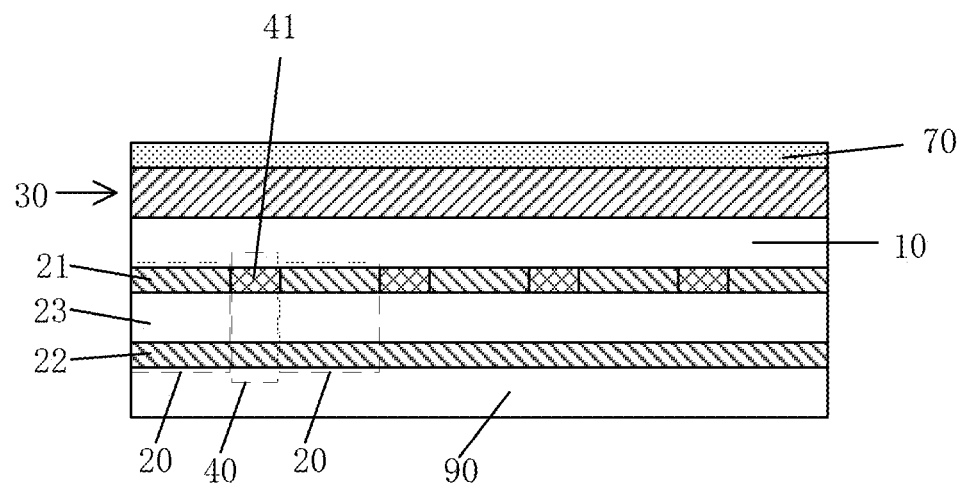
Figure 10E:
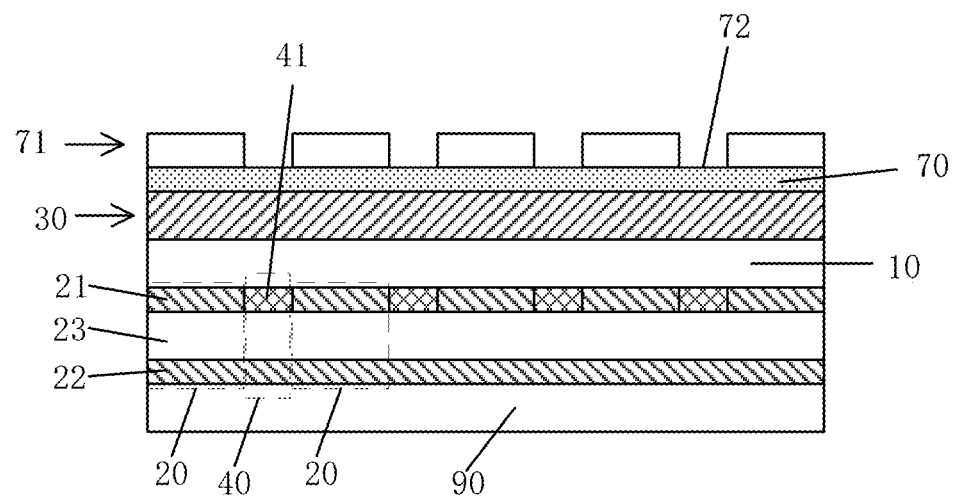
Figure 10F:
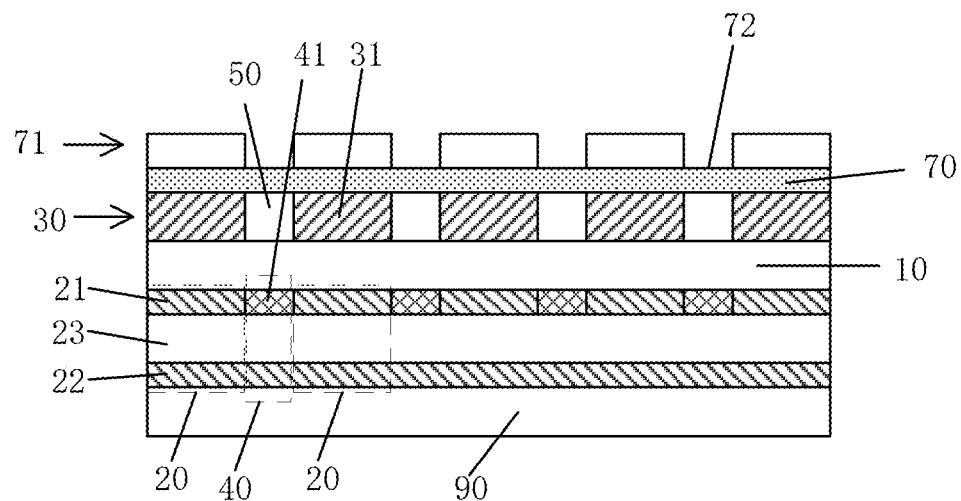
Figure 10G:
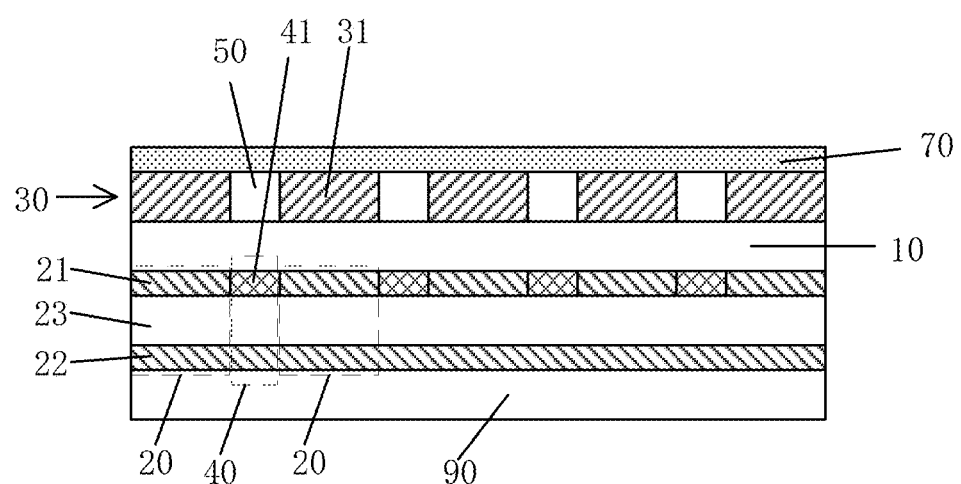
Figure 10H:
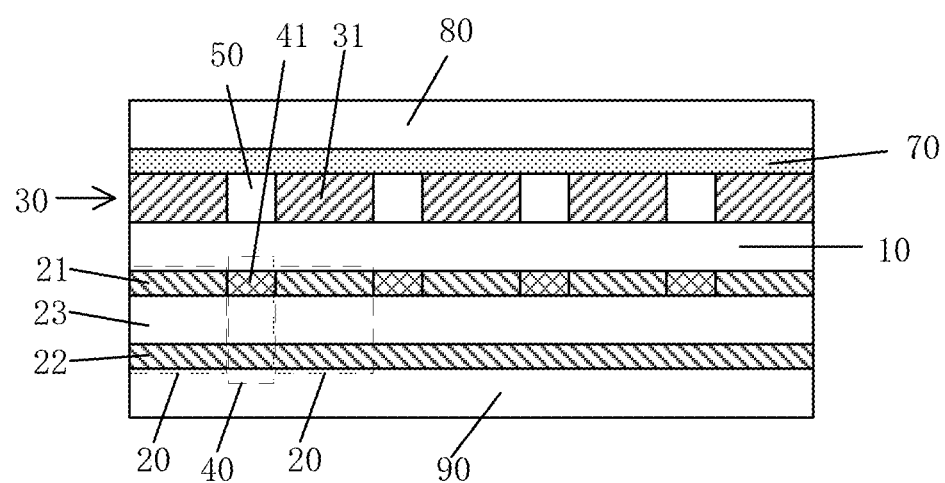

In the step S20', as shown in FIG. 10C, a material of the acoustic matching layer may be spin-coated on the side of the base substrate 10 (for example, back glass) away from the ultrasonic transducers 20, with a thickness of, for example, a quarter wavelength of ultrasonic waves to be used. The material of the acoustic matching layer 30 may include, for example, epoxy resin including a filler for adjusting acoustic impedance. The filler includes but is not limited to doped tungsten, tungsten oxide, iron oxide, titanium dioxide, silicon dioxide, talc and the like. In the step S30', as shown in FIG. 10D, the pore layer 70 may be a porous silicon layer with a thickness between 0.5 µm and 5 µm, so as to ensure that the thickness of the porous silicon layer does not affect the transmission of the ultrasonic waves. In the step S40', as shown in FIG. 10E, the patterned mask layer 71 may be formed by providing (for example, coating) a photosensitive resist (photoresist) layer on the side of the pore layer 70 away from the base substrate 10 and patterning the photoresist layer. Positions 72 where isolation cavities will be formed are positions in the pore layer 70 corresponding to the isolation cavities 50 to be formed. For example, orthographic projections of positions 72 where isolation cavities will be formed on the base substrate are substantially consistent with orthographic projections of finally-formed isolation cavities 50 on the base substrate. In the step S50', as shown in FIG. 10F, the etching gas may penetrate the pore layer 70 through these positions in the pore layer 70 to etch (for example, by reacting with the acoustic matching layer 30) the acoustic matching layer 30 so as to form the isolation cavities 50. In the step S60', as shown in FIG. 10G, the patterned mask layer 71 (for example, photosensitive resist (photoresist)) may be removed by a peeling process known in the art. In the step S70', as shown in FIG. 10H, the insulating layer 80 may be formed on the side of the pore layer 70 away from the base substrate 10 by coating, attaching, or the like.

Similarly, in addition to the above steps and sub-steps, in some embodiments, the manufacturing method may further include: providing a protective layer on a side of the second electrode layer 22 away from the base substrate 10 to seal and protect the ultrasonic transducer 20. A material of the protective layer may be epoxy resin, and the protective layer may be formed by attaching or spin-coating epoxy resin on a surface of the second electrode layer 22 away from the base substrate 10. As an example, the above-mentioned step of providing the protective layer may be performed between step S10' and step S20' to simplify the process, referring to FIG. 10B.

The manufacturing methods of the piezoelectric sensor assembly as described above are only exemplary, and the embodiments of the present disclosure are not limited thereto. In the embodiments of the present disclosure, the organic light emitting diode assembly 91 may be attached on a side of the base substrate 10 of the piezoelectric sensor assembly 100 away from the ultrasonic transducer 20 or on a side of the insulating layer 80 of the piezoelectric sensor assembly 100' away from the base substrate 10, so as to form the display panel.

Embodiments of the present disclosure also provide an electronic device, which includes the piezoelectric sensor assembly as described in any of the foregoing embodiments or the display panel as described in any of the foregoing embodiments. In the embodiments of the present disclosure, the electronic device may include any electronic device with a display function, such as a mobile phone, a notebook computer, a tablet computer, a television, a navigator, a digital photo frame, and so on.

Although the present disclosure has been described with reference to the accompanying drawings, the embodiments disclosed in the accompanying drawings are intended to exemplify the embodiments of the present disclosure, and should not be understood as limiting the present disclosure. The dimensional ratios in the drawings are only schematic and should not be construed as limiting the present disclosure.

The above-mentioned embodiments only exemplarily illustrate the principle and structure of the present disclosure, but are not configured to limit the present disclosure. Those skilled in the art should understand that any changes and improvements made to the present disclosure without departing from the general concept of the present disclosure are within the scope of this disclosure. The protection scope of the present disclosure shall be defined by the claims of the application.

What is claimed is:

1. A piezoelectric sensor assembly, comprising:
   a base substrate;
   a plurality of ultrasonic transducers, wherein a spacing area is provided between two adjacent ultrasonic transducers; and
   an acoustic matching layer, wherein the acoustic matching layer comprises a plurality of acoustic matching areas, and an orthographic projection of at least one acoustic matching area on the base substrate falls into an orthographic projection of the ultrasonic transducer corresponding to the acoustic matching area on the base substrate,
   wherein an isolation cavity is provided between two adjacent acoustic matching areas; and
   wherein the piezoelectric sensor further comprises: a pore layer on a side of the acoustic matching layer away from the base substrate.

2. The piezoelectric sensor assembly according to claim 1, wherein the isolation cavity is a vacuum cavity or filled with air.

3. The piezoelectric sensor assembly according to claim 1, wherein the pore layer comprises a porous silicon layer.

4. The piezoelectric sensor assembly according to claim 1, wherein each ultrasonic transducer comprises:
   a first electrode layer;
      a piezoelectric material layer on a side of the first electrode layer away from the base substrate; and
   a second electrode layer on a side of the piezoelectric material layer away from the base substrate.

5. The piezoelectric sensor assembly according to claim 4, wherein the spacing area comprises a dielectric layer between first electrode layers of two adjacent ultrasonic transducers.

6. The piezoelectric sensor assembly according to claim 4, wherein piezoelectric material layers of all the ultrasonic transducers are connected to each other to form an integrity, and second electrode layers of all the ultrasonic transducers are connected to each other to form an integrity.

7. The piezoelectric sensor assembly according to claim 1, wherein the base substrate is located on a side of the acoustic matching layer away from the ultrasonic transducers.

8. The piezoelectric sensor assembly according to claim 7, wherein an acoustic impedance of the acoustic matching layer is between an acoustic impedance of the base substrate and an acoustic impedance of the piezoelectric material layer.

9. The piezoelectric sensor assembly according to claim 8, wherein the acoustic impedance of the acoustic matching layer is a geometric average between the acoustic impedance of the base substrate and the acoustic impedance of the piezoelectric material layer.

10. The piezoelectric sensor assembly according to claim 1, wherein the base substrate is located between the acoustic matching layer and the ultrasonic transducers.

11. The piezoelectric sensor assembly according to claim 10, further comprising an insulating layer on a side of the acoustic matching layer away from the base substrate.

12. The piezoelectric sensor assembly according to claim 11, wherein the acoustic impedance of the acoustic matching layer is between the acoustic impedance of the base substrate and an acoustic impedance of the insulating layer, and/or,
  wherein the acoustic impedance of the acoustic matching layer is a geometric average between the acoustic impedance of the base substrate and the acoustic impedance of the insulating layer.

13. The piezoelectric sensor assembly according to claim 1, wherein a thickness of the acoustic matching layer is a quarter of wavelength of ultrasonic wave emitted by the ultrasonic transducers; and/or
  the piezoelectric sensor assembly further comprising a protective layer on a side of the ultrasonic transducers away from the base substrate; and/or
wherein the plurality of ultrasonic transducers are arranged in an array on a side of the base substrate.

14. A display panel, comprising the piezoelectric sensor assembly according to claim 1.

15. An electronic device, comprising the piezoelectric sensor assembly according to claim 1.

16. A manufacturing method of a piezoelectric sensor assembly, comprising:
  forming an acoustic matching layer on a base substrate;
  depositing a pore layer on a side of the acoustic matching layer away from the base substrate;
  forming a patterned mask layer on a side of the pore layer away from the base substrate to expose positions where isolation cavities will be formed;
  performing dry etching to allow etching gas to penetrate the pore layer at the positions where isolation cavities will be formed to form isolation cavities in the acoustic matching layer;
  removing the patterned mask layer; and
  forming a plurality of ultrasonic transducers on a side of the pore layer away from the base substrate.

17. The manufacturing method of the piezoelectric sensor assembly according to claim 16, wherein the forming the plurality of ultrasonic transducers on the side of the pore layer away from the base substrate comprises:
  forming a first electrode layer on the side of the pore layer away from the base substrate and patterning the first electrode layer to form a plurality of first electrode parts spaced apart from each other;
  forming a dielectric layer between adjacent first electrode parts, wherein an orthographic projection of the dielectric layer on the base substrate falls into orthographic projections of the isolation cavities on the base substrate;
  forming a piezoelectric material layer on a side of the first electrode parts and the dielectric layer away from the base substrate; and
  depositing a second electrode layer on a side of the piezoelectric material layer away from the base substrate.

18. A manufacturing method of a piezoelectric sensor assembly, comprising:
  forming a plurality of ultrasonic transducers on a base substrate;
  forming an acoustic matching layer on a side of the base substrate away from the plurality of ultrasonic transducers;
  depositing a pore layer on a side of the acoustic matching layer away from the base substrate;
  forming a patterned mask layer on a side of the pore layer away from the base substrate to expose positions where isolation cavities will be formed;
  performing dry etching to allow etching gas to penetrate the pore layer at the positions where isolation cavities will be formed to form isolation cavities in the acoustic matching layer;
  removing the patterned mask layer; and
  forming an insulating layer on a side of the pore layer away from the base substrate.

19. The manufacturing method of the piezoelectric sensor assembly according to claim 18, wherein the forming the plurality of ultrasonic transducers on the base substrate comprises:
  forming a first electrode layer on a side of the base substrate and patterning the first electrode layer to form a plurality of first electrode parts spaced apart from each other;
  forming a dielectric layer between adjacent first electrode parts, wherein an orthographic projection of the dielectric layer on the base substrate falls into orthographic projections of the isolation cavities on the base substrate;
  forming a piezoelectric material layer on a side of the first electrode parts and the dielectric layer away from the base substrate; and
  depositing a second electrode layer on a side of the piezoelectric material layer away from the base substrate.

\* \* \* \* \*